(No Model.) 2 Sheets—Sheet 1.
E. ROBARDS.
LAND MEASURING MACHINE.
No. 382,438. Patented May 8, 1888.
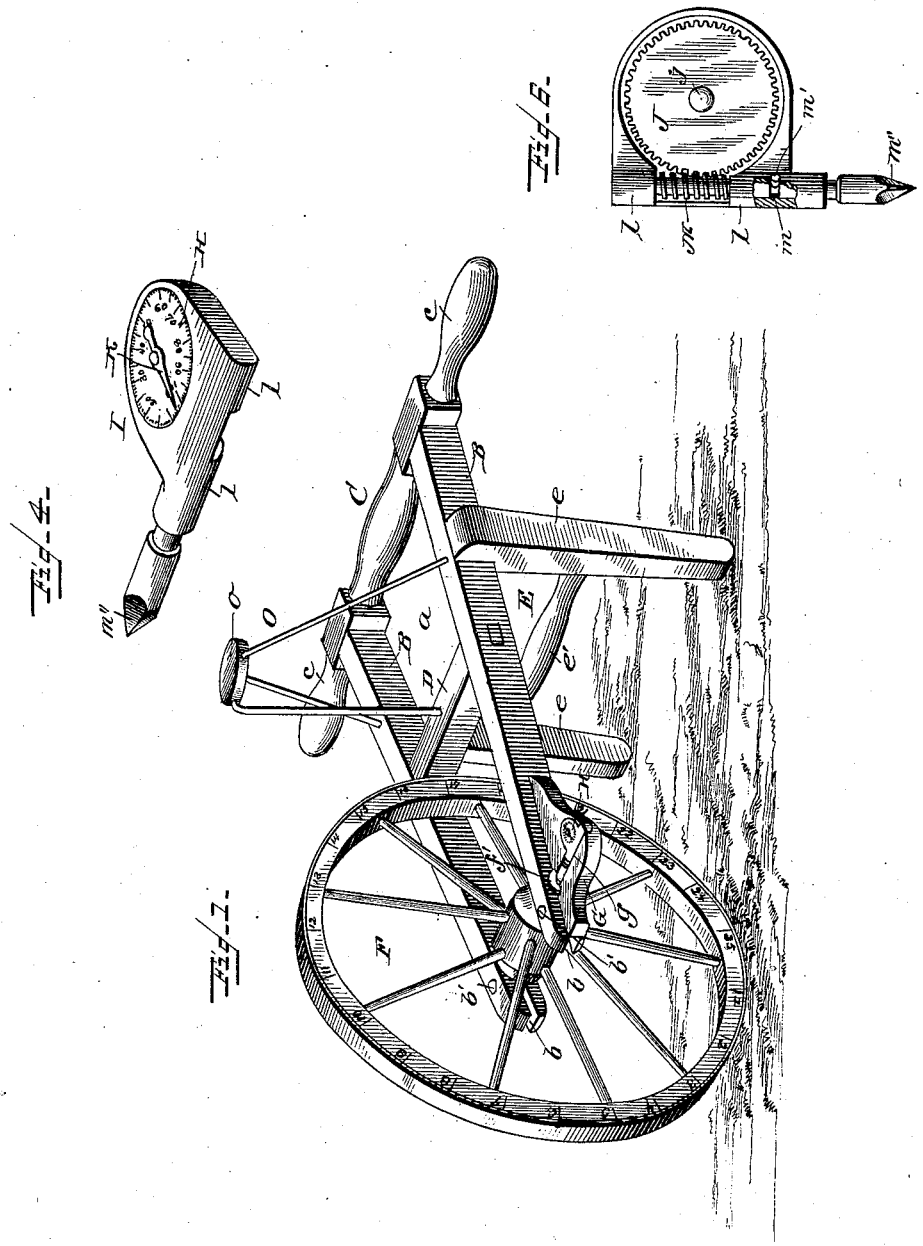
WITNESSES
Edwin L. Yewell,
Jos. A. Ryan.
INVENTOR
Edward Robards
by J. R. Littell,
Attorney

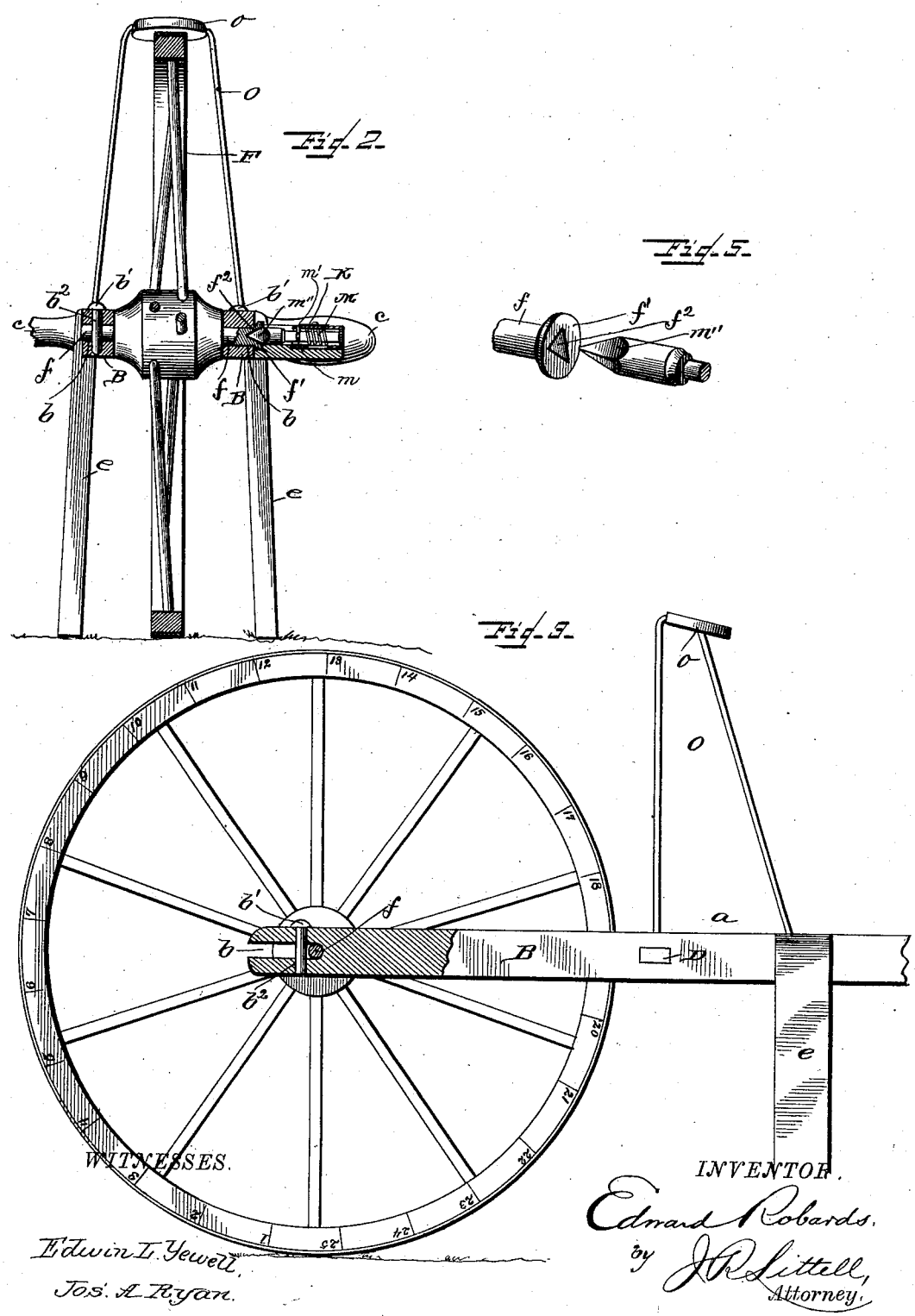

UNITED STATES PATENT OFFICE.

EDWARD ROBARDS, OF STILESVILLE, INDIANA.

LAND-MEASURING MACHINE.

SPECIFICATION forming part of Letters Patent No. 382,438, dated May 8, 1888.

Application filed January 5, 1888. Serial No. 259,855. (No model.)

*To all whom it may concern:*

Be it known that I, EDWARD ROBARDS, a citizen of the United States, residing at Stilesville, in the county of Hendricks and State of Indiana, have invented certain new and useful Improvements in Land-Measuring Machines, of which the following is a specification.

This invention relates to land-measuring machines; and the object of my invention is to provide a machine of this character for use in measuring land, roads, &c., and adapted to be efficiently used in lieu of a surveyor's chain, for the purposes specified.

A further object of my invention is to provide a simple and accurate measurer, which may be operated by any one, and will not require an expert surveyor to make the necessary calculations, and which is not liable to get out of order.

In the drawings, Figure 1 is a perspective view of a land-measuring instrument embodying my improvements. Fig. 2 is a transverse sectional view taken through the axle. Fig. 3 is a vertical longitudinal sectional view. Fig. 4 is a detail perspective view of the indicator. Fig. 5 is a detail perspective view of the connection between the end of the axle and the indicator. Fig. 6 is a bottom or inverted plan view of the indicator.

Corresponding parts in the figures are denoted by the same letters of reference.

Referring to the drawings, A designates the frame, which is composed of two forwardly-convergent longitudinal beams, B B, connected at their rear ends by a cross-beam, C, having handles $c$ at its ends, and said beams are also connected by a cross-beam, D, provided between them some distance from their rear ends. A rest or support, E, is also provided upon the beams B near their rear ends, consisting of two downwardly-extending legs, $e\,e$, connected and braced by a cross-piece, $e'$. The front ends of the beams B are formed with longitudinally-disposed recesses or slots $b$. Within these slots $b$ is removably secured the axle $f$ of a wheel, F, which is rigidly secured to said axle, adapted to rest upon the ground and revolve when the device is operated. The axle is preferably retained within the slots by vertical screws or bolts $b'$, passing through transverse eyes or perforations $b^2$ in the beams B in front of said axle. The wheel is preferably sixteen and a half feet (one rod) in circumference, and is provided with a scale upon one side of the rim or felly or at its outer edge, dividing it into twenty-five equal sections, as shown, and numbered from one to twenty-five, inclusive, said sections corresponding in length to the links of a surveyor's chain, for the purpose hereinafter set forth.

Upon the outer side of one of the beams B, at its front end, is secured a horizontal bracket, G, recessed upon its top side, as shown at $g$. Within this recess and corresponding in shape to the same is seated an indicator, H. This indicator comprises an approximately U-shaped casing, I, preferably constructed of metal. The indicating mechanism preferably comprises within said casing a gear or toothed wheel, J, having a shaft, $j$, rigidly secured thereto and extending upwardly through an eye or opening in the top of the casing, and carrying an arrow or indicator, K, at its top end designed to register the number of revolutions of the wheel F upon a concentric scale upon the top of the casing I.

At the front edge of the casing are provided bearings $l\,l$ for a transverse worm pin or shaft, M, meshing with the toothed wheel J. This shaft M is retained against longitudinal displacement preferably by means of a circumferential recess, $m$, and a pin, $m'$, provided through the casing engaging said recess.

The shaft M registers with the axle of the wheel F, and its free end terminates in a pyramidal or angular point, $m''$, engaging the sides of a corresponding recess, $f^2$, in the flanged end $f'$ of the axle $f$. It will thus be seen that as the wheel F revolves with its axle, motion is communicated to the shaft M, which in turn imparts motion to the toothed wheel J and the arrow K, connected therewith, which automatically registers the number of revolutions of the wheel F.

A tripod, O, is provided upon the rear part of the device, upon which a surveyor's compass may be placed. The top $o$ of this tripod is so arranged at an angle to the beams B that when the rear of the machine is raised to operate it the compass will be in a horizontal plane.

The operation of my invention is as follows: The figure 25 on the wheel F is placed at the starting-point and the arrow or indicator at the figure 1,000, (the indicator preferably registering one thousand revolutions of the wheel.) The machine is then pushed forward by the operator until the terminal point is reached. The number of revolutions of the wheel, or number of rods traversed, will be registered upon the indicator, while the figure at the bottom of the wheel, when it reaches the terminal line, will indicate the number of links in addition to the number of rods.

I claim as my invention—

1. The combination, in a land-measuring device, with the frame having a carrying-wheel secured at its front end, of a tripod mounted in rear of said wheel, having a rearwardly-inclined top for the reception of a compass or other instrument and the retention of said instrument in horizontal position when the machine is inclined or operated, substantially as set forth.

2. The combination, in a measuring device, with the frame, of an indicator provided at one side thereof, comprising a gear, a worm-shaft meshing therewith, and having an angular or pyramidal shaped inner end, a carrying-wheel provided with a scale at its outer edge, and mounted upon an axle having a recessed end corresponding to and adapted to engage the pyramidal end of the worm shaft, substantially as set forth.

3. The combination, in a measuring device, with the frame, of a carrying-wheel mounted at the forward end thereof, and an indicator connected with said wheel, and comprising a casing provided with a concentric scale, a gear seated therein, a worm-shaft mounted in said casing, and a pin engaging a circumferential groove in said shaft to prevent lateral displacement thereof, substantially as set forth.

4. The herein-described land-measuring device, comprising the frame, an indicator provided at one side thereof, and comprising a worm-shaft having a pyramidal-shaped end, a carrying-wheel having a circumferential scale, mounted at the forward end of the frame upon a shaft, said shaft having a recessed end corresponding to and engaging the pyramidal end of the worm shaft, and a tripod having an inclined top mounted on the frame, said top being adapted to assume a horizontal position when the device is operated, substantially as set forth.

5. The herein-described land-measuring device, consisting of the frame, comprising two forwardly-convergent longitudinal beams, handles provided at the rear ends of the same, a rest, or support, near the rear ends of said beams, a tripod upon the beams, an operating-wheel having its axle removably secured in slots at the front end of the beams, the outer edge of said wheel being provided with a scale, a recess in the end of the axle, and an indicator comprising a worm pin or shaft, having a pyramidal or angular end engaging said corresponding recess, substantially as and for the purpose set forth.

In testimony whereof I affix my signature in presence of two witnesses.

EDWARD ROBARDS.

Witnesses:
W. A. STEARS,
JOHN A. PHILLIPS.